United States Patent [19]
Rabbani et al.

[11] Patent Number: 5,442,458
[45] Date of Patent: Aug. 15, 1995

[54] METHOD AND ASSOCIATED APPARATUS FOR ENCODING BITPLANES FOR IMPROVED CODING EFFICIENCY

[75] Inventors: Majid Rabbani, Pittsford; Paul W. Melnychuck, W. Henrietta, both of N.Y.

[73] Assignee: Eastman Kodak Company, Rochester, N.Y.

[21] Appl. No.: 809,364

[22] Filed: Dec. 18, 1991

[51] Int. Cl.$^6$ .............................................. H04N 1/00
[52] U.S. Cl. .................. 358/426; 358/261.3; 358/262.1; 358/432
[58] Field of Search .............. 358/426, 261.3, 427, 358/262.1, 432, 433, 427, 429, 452; 382/56

[56] References Cited

U.S. PATENT DOCUMENTS

| | | | |
|---|---|---|---|
| 4,409,623 | 10/1983 | Kobayashi et al. | 358/261 |
| 4,414,580 | 11/1983 | Johnsen et al. | 358/260 |
| 4,546,385 | 10/1985 | Anastassiou | 358/426 |
| 4,652,935 | 3/1987 | Endoh et al. | 358/260 |

OTHER PUBLICATIONS

I. H. Witten, R. M. Neal, and J. G. Cleary, "Arithmetic coding for Data compression," Comm. of the ACM, vol. 30 No. 6 (1987).
R. Hunter and A. H. Robinson, "International Digital Coding Standards," Proc. of the IEEE, vol. 68 No. 7 (1980).
P. W. Melnychuck and M. Rabbani, "Survey of lossless image coding techniques", SPIE vol. 1075 Digital Image Processing Applications, pp. 92–100, 1989.
W. B. Pennebaker, J. L. Mitchell, G. G. Langdon, Jr., and R. B. Arps, "An overview of the basic principles of the Q–coder adaptive binary arithmetic coder," IBM J. Res. Dev., vol. 32, No. 6, pp. 717–726, 1988.
ISO/IEC Committee Draft 11544—Coded Representation of Picture and Audio Information—Progressive Bi-level Image Compression, WG9-SIR4 Sep. 11, 1991.
K. Takahasi and M. Ohta, "Data compression coding of gray-scale images using bit planes", in Proc. ICC, vol. 2.3.1., pp. 34–41, 1985.
R. W. Hamming, Coding and Information Theory, 2Nd ed., Prentice-Hall: Englewood Cliffs, N.J., pp. 97–99, 1986.
G. G. Langdon, Jr. and J. Rissanen, "Compression of black-white images with arithmetic coding", IEEE Trans. Commun., vol. COM-29(6), pp. 858–867, 1981.
J. W. Schwartz and R. C. Barker, "Bit-plane encoding: A technique for source encoding," IEEE Trans. Aerosp. Electron., Syst., vol. AES-2, No. 4, pp. 385–392 1966.
T. S. Huang and O. J. Tretiak, Eds., Picture Bandwidth Compression, Gordon and Breach: New York, 1972.
M. Kunt and O. Johnsen, "Block encoding of graphics: A tutorial review", Proc. IEEE, vol. 68, No. 11, pp. 770–786, 1980.

*Primary Examiner*—Edward L. Coles, Sr.
*Assistant Examiner*—Jerome Grant, II
*Attorney, Agent, or Firm*—Peyton C. Watkins

[57] ABSTRACT

An encoding method is described for image bitplanes whereby an arithmetic coder using conditioning contexts based on pixels from both the current bitplane and previously decoded bitplanes is employed. For the same number of contexts (which is important for minimizing memory usage), the method provides for higher compression than those methods based on a single bitplane context. An additional improvement over the prior art is that the method eliminates the need to form a Gray code bit plane representation, as is commonly done to reduce the correlation among bit planes. However, if used on conjunction with the gray code, a small improvement in compression performance will still be realized.

13 Claims, 3 Drawing Sheets

METHOD AND ASSOCIATED APPARATUS FOR ENCODING BITPLANES FOR IMPROVED CODING EFFICIENCY

TECHNICAL FIELD OF THE INVENTION

The present invention is related to the field of digital image processing and more particularly to a method and associated apparatus for creating and encoding binary bitplanes of a gray-level, continuous tone image.

BACKGROUND OF THE INVENTION

One well known method of encoding a gray image decomposes the digital representation of the image into bitplanes. Each of the bitplanes carries the bit values associated with its level of resolution or importance, for example, the most significant bitplane carries the most significant bits that form the image. Bitplane decomposition is commonly employed in systems where it is desired to store or transmit a gray-level image in a progressive fashion. That is where the most important information (most likely contained in the most significant bitplane) needed for scene recognition is stored or transmitted first, followed by the remaining bitplanes in descending order. Such a scheme is useful for real-time applications where it is desirable to browse through a collection of images while retaining the capability of terminating the reconstruction during decoding to proceed to the next image. In order to decrease memory storage space and the amount of transmission time needed to handle these images, binary image compression techniques are applied to each of the individual bitplanes. The extent to which these techniques effectively compress the bitplanes will determine the speed at which a stored or transmitted image can be displayed.

PRIOR ART

A number of bitplane decomposition methods and encoding schemes have been described in the technical literature, and in various patents. Of particular relevance to the present invention are the following publications and patents:

- J. W. Schwartz and R. C. Barker, "Bit-plane encoding: A technique for source encoding," IEEE Trans. Aerosp. Electron., Syst., vol AES-2, no. 4, pp. 385-392 1966.
- T. S, Huang and O. J. Tretiak, Eds., Picture Bandwidth Compression, Gordon and Breach: New York, 1972.
- M. Kunt and O. Johnsen, "Block encoding of graphics: A tutorial review", Proc. IEEE, vol. 68, no. 11, pp.770-786, 1980.
- K. Takahasi and M. Ohta, "Data compression coding of gray-scale images using bit planes", in Proc. ICC, vol. 2.3.1, pp. 34-41, 1985.
- R. W. Hamming, Coding and Information Theory, 2Nd ed., Prentice-Hall: Englewood Cliffs, NJ, pp. 97-99, 1986.
- G. G. Langdon, Jr. and J. Rissanen, "Compression of black-white images with arithmetic coding", IEEE Trans. Commun., vol. COM-29(6), pp. 858-867, 1981.
- P. W. Melnychuck and M. Rabbani, "Survey of lossless image coding techniques", SPIE Vol. 1075 Digital Image Processing Applications, pp. 92-100, 1989.
- W. B. Pennebaker, J. L. Mitchell, G. G. Langdon, Jr., and R. B. Arps, "An overview of the basic principles of the Q-coder adaptive binary arithmetic coder," IBM J. Res. Dev., vol. 32, no. 6, pp. 717-726, 1988.
- ISO/IEC Committee Draft 11544 —Coded Representation of Picture and Audio Information—Progressive Bi-level Image Compression, WG9-SIR4 Sep. 11, 1991.
- I. H. Witten, R. M. Neal, and J. G. Cleary, "Arithmetic coding for Data compression," Comm. of the ACM, vol. 30, no. 6 (1987).
- R. Hunter and A. H. Robinson, "International Digital Coding Standards," Proc. of the IEEE, vol. 68 no. 7 (1980).
- U.S. Pat. No. 4,409,623, Kobayashi, et al. "Method and equipment for processing gray scale facsimile signal," Oct. 11, 1983.
- U.S. Pat. No. 4,414,580. Johnsen, et al. "Progressive transmission of two-tone facsimile," Nov. 8, 1983.
- U.S. Pat. No. 4,652,935, Endoh, et al., "Graded facsimile image signal coding system," Mar. 24, 1987.

By way of a background presentation if we look at FIG. 1, and assume that a digital image contains m×n pixels each having a pixel value f(i,j) where i and j are the coordinates of the pixel and where the value is represented by an equivalent k-bit binary number, for example, 10011001 (8-bits), extending from the most significant bit to the least significant bit, and if we form an m×n matrix using only the most significant bits then that image will be bitplane image representing the most significant bits. If the same operation is performed on the last least significant) bits of each of the k-bits, that image will be a bitplane image representing the least significant bits. With a k number of bits a k number of bitplanes may thus be formed. In this way, the original image can be decomposed into a set of k, m×n bitplanes numbered 1 for the least significant bit LSB) bitplane through k for the most significant bit MSB) bitplane. Bitplanes offer a reversible decomposition that can be exploited in a lossless compression scheme by encoding each bitplane using a lossless binary compression technique. Conventional binary compression techniques include the modified Huffman coding method and the modified Read coding method internationally standardized by CCITT (see the article, "International Digital Coding Standards" referred previously). These techniques have been developed based on the statistics of a certain class of images, such as text, maps, and line drawings; they are generally not suitable for the efficient encoding of pictorial images represented by bitplane decomposition. A more efficient technique employing arithmetic coding is described in ISO/IEC Committee Draft 11544—Coded Representation of Picture and Audio Information —Progressive Bi-level Image Compression, WG9-SIR4 Sep. 11, 1991, the recently developed JBIG (joint binary image group) world standard. The embodiment described herein can employ the JBIG arithmetic coder as a subcomponent, however the context models described herein are an improvement over the prior art, and hence are the objects of the present invention. It should be noted that any arithmetic coder can be used in the present invention, such as those described in the articles previously referenced to Pennebaker, Mitchell, and Langdon, and, to Witten, Neal, and Cleary.

Bitplane encoding also allows for progressive transmission. In progressive transmission, the MSB bitplane is transmitted first since it contains much of the structural information and is highly compressible. The remaining bitplanes are then transmitted in sequential order, with the LSB bitplane being transmitted last. At the receiving end, the bitplanes are combined as they are received to build successive approximations to the original image. The publications by Schwartz and Barker, Huang and Tretiak, Kunt and Johnsen, and Takahashi and Ohta all teach methods of bitplane decomposition and their application to the progressive transmission of images.

The patent to Kobayashi, et al., teaches a method for encoding gray scale images in a facsimile application by a block coding method. An image is divided into a plurality of blocks, each of which is a facsimile signal for one of a plurality of blocks into which a frame of the original image is divided. Each of the blocks is composed of a plurality of pixels. Each block is represented by gradation and binary space information which is subsequently coded into binary codes for encoding via the above mentioned internationally standardized codes. The primary advantage of this technique over the prior art is the ability to code gray-level images using international standard coding methods for binary images. The disadvantage is that the encoding process does not provide for an exact reproduction of the original image.

The patent to Johnsen, et al., teaches a progressive transmission scheme of bi-level images. In a first stage, information representing groups of pixels of preselected horizontal lines are transmitted to provide a coarse rendition of the image. During subsequent stages the horizontal resolution is improved by transmitting additional scan lines in a specified order until the received image is an identical copy of the original image. The short coming in this method is that it does not accommodate gray-level images.

The prior art teaches bitplane encoding algorithms that typically encode the bit planes independently, and, that take advantage of the existence of large uniform areas (coherency) in each bitplane to achieve high compression. To this end, it is desirable to form the bitplanes in such a way as to minimize their complexity, e.g., using the transitions among the neighboring binary pixel values in each bitplane. Unfortunately, construction of the bitplanes from the conventional binary representation of the pixel values does not achieve this purpose. To illustrate this point, consider an 8-bit image whose pixel values randomly fluctuate between the code values 127 and 128. Although the entropy of this image is only 1 bit/pixel, independent encoding of the bitplanes requires a total of 8 bits/pixel. This is seen from the binary representations of the integers 127 and 128, which are 01111111 and 10000000, respectively. Since they differ at every bit position, the resulting bitplanes lack coherence. The publication by Hamming teaches a method for alleviating this problem by forming the Gray code representation of the pixel values, instead of the binary representation. The Gray code is a method of mapping a set of numbers into a binary alphabet such that successive numerical changes result in a change of only one bit in the binary representation. Thus, when two neighboring pixels differ by one code value, only a single bitplane is affected. The MSB bitplanes of the binary and the Gray codes are identical while, in general, the complexity (as measured by the number of transitions) of the $1^{th}$ Gray code bitplane is approximately the same as the complexity of the $(1+1)^{th}$ binary bitplane. Note that in this example, all of the bitplanes in the binary representation are completely correlated, and a scheme that jointly encodes the bitplanes could potentially take advantage of this correlation to achieve the 1 bit/pixel rate.

The patent to Endoh, et al., teaches a gray-level progressive facsimile image encoding system comprising of a bitplane decomposition of a gray-level image, Gray code transformation, and compression via run length and modified Huffman encoding. The main advancement in the patent to Endoh is the unique method of ordering the pixel data for transmission in descending order of information content to provide a hierarchical method of transmission for a gray-level image using bitplane decomposition. The present invention is essentially an improvement over the method of Endoh in the encoding of the bitplanes, through the use of an adaptive binary arithmetic coder.

The application of adaptive binary arithmetic coders to the encoding of binary images has been addressed in the publications by Langdon and Rissanen, and Melnychuck and Rabbani. The Langdon and Rissanen publication teaches a method whereby m neighboring pixels of the current pixel can be used to form a conditioning context for encoding that pixel value. In this model, the image is assumed to have been generated by a Markov source, whereby each combination of the m neighboring pixels results in a distinct probability distribution of the pixel to be encoded. In general, m binary-valued pixels constitute $2^m$ combinations, whereby each combination is used to form a context. For reference, FIG. 2 illustrates a two-dimensional (2-D) 7-pixel (128 contexts) orientation used by Langdon and Rissanen to encode the pixel x.

SUMMARY OF THE INVENTION

The present invention is an improvement over the prior art in the compression, or encoding of the decomposed bitplanes. As we have seen, the primary motivation for using the Gray code is to create coherent bitplanes that can be encoded independently. However, if information contained in the previously encoded bitplanes can be utilized in the encoding of the current bitplane, there should be little gain in using the Gray code representation.

To attain the primary object of the present invention, there is disclosed a gray-level image encoding system, incorporating a means for decomposing a gray-level image signal represented by $2^k$ levels into k bitplanes, and an arithmetic encoding method using conditioning contexts based on pixels from both the current bitplane and the previously decoded bitplanes. In the present invention, an efficient bitplane encoding method is created by incorporating other bitplane information and by extending the context pixel assignment to include pixels from both the current and previous bitplanes, thus eliminating the need to form the Gray code representation. The three-dimensional contexts formed by current and previously decoded bitplanes, are chosen in such a way that the total number of context storage bins required for the arithmetic coder remains the same, as in the two-dimensional context formed by pixels from the current bitplane alone. For example, again referring to FIG. 2, the 7-pixel context can be modified by deleting those pixels in the current bitplane labeled B, C, and G, and using instead the pixels labeled x, A, and E from the previously decoded (more significant) bitplane. The least significant bitplane can be encoded first, and transmission can be performed from the least significant bitplane to most significant bitplane but, the preferred mode is one whereby the most significant bitplane is encoded without reference to another bitplane, and then each subsequent bitplane is encoded using pixels from the previously encoded, (and decoded) bitplane(s) to form the context. This allows for the progressive transmission of the image in order of increasing image quality, which is desirable in this invention.

From the foregoing, it can be seen that it is an object of the present invention to provide a method for efficiently storing, transmitting, and/or displaying digital images in a progressive mode.

It is another object of the present invention to provide a progressive encoding system that minimizes hardware requirements, storage space, and cost.

These and other objects of the present invention will become more apparent when taken in conjunction with the following description and drawings wherein like characters indicate like parts and which drawings form a part of the present description.

DESCRIPTION OF THE PREFERRED EMBODIMENT

Figure 1:
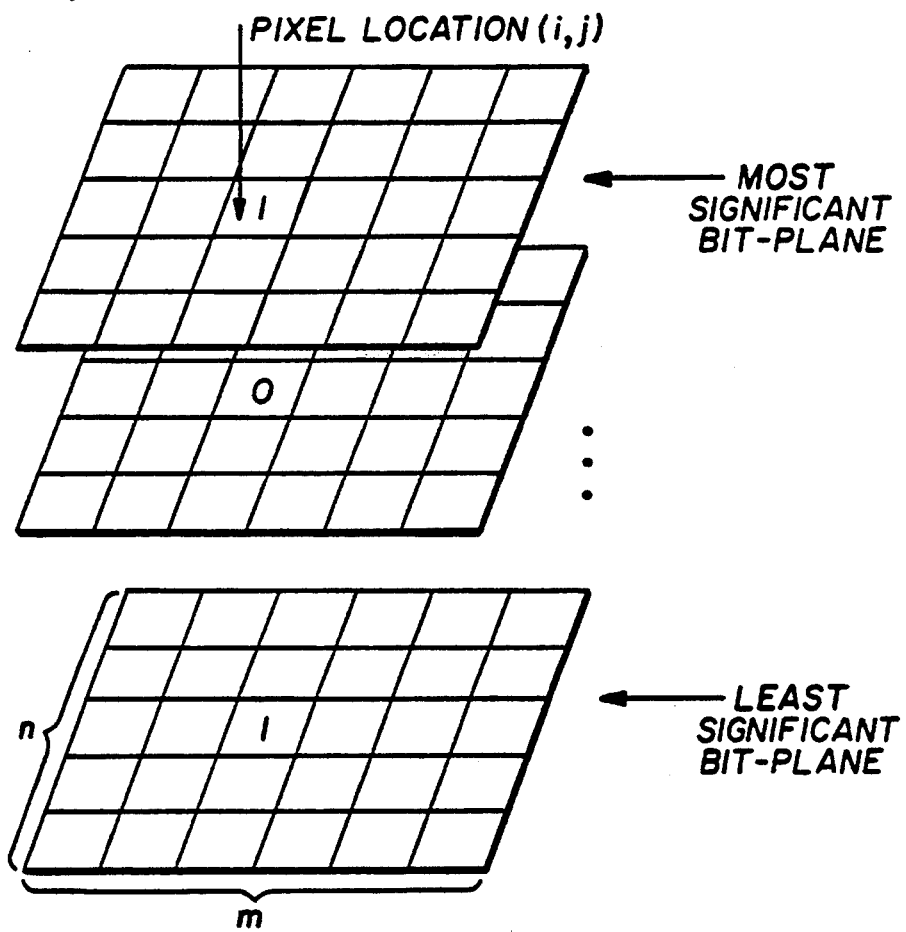
FIG. 1 is an exploded view of a number of bitplanes each representing m×n binary pixel values.
Figure 2:
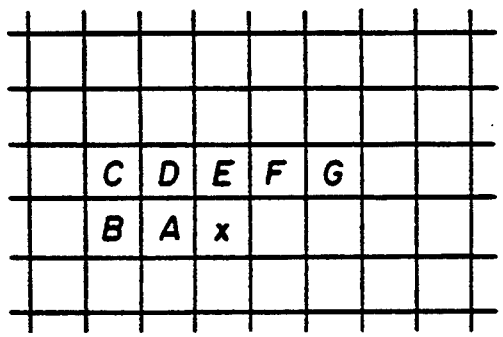
FIG. 2 is a diagram of a 7-pixel two-dimensional context configuration used by the arithmetic encoder block of FIG. 3.

Referring to FIG. 2, as previously discussed, a number of known techniques predict the value of the bit x by examining the value of the bits that are in the proximate neighborhood. For example, if bits B,A, and E are 1's it is highly probable that x is also a 1. In the present invention, values of bits that have already been determined in preceding rows, are looked at to predict the value of the bit that is of present interest, along with extending the look to the previously determined bit values in previously decoded bitplanes. The 7-pixel context, consisting of pixels A through G can be modified by deleting those pixels in the current bitplane labeled B, C, and G, and using instead the pixels labeled x, A, and E from the previously decoded bitplane or if known, the pixels in the next ordered bitplane. In the preferred embodiment, the most significant bitplane is first encoded without reference to another bitplane, and then each subsequent bitplane is encoded using pixels from the previously encoded (and decoded) bitplane to form the context. Experimentation with various pixel combinations from the bitplane to be encoded, and the previously decoded bitplane, revealed that generally better results were achieved when the number of pixels used in the context were distributed roughly evenly between the previously decoded and the current bitplanes. However, depending upon the image type (e.g. multi-level text or line art) any number of pixels from any number of previously decoded bitplanes may be employed for the formation of the context.

Figure 3:
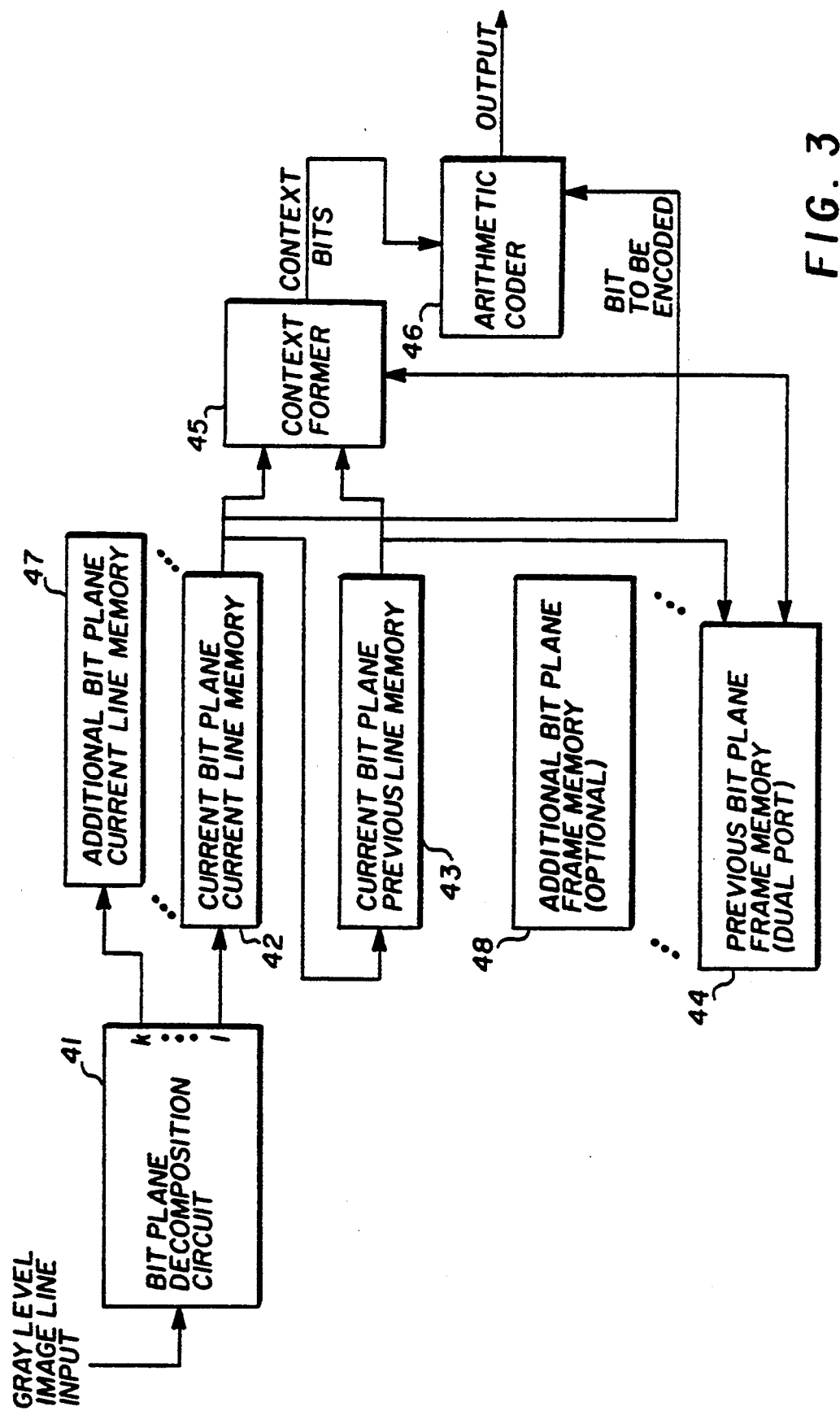
FIG. 3 is a schematic block diagram illustrating the preferred embodiment of the invention employing a bitplane decomposition circuit, memory, three-dimensional context former, and an arithmetic coder.

Referring to the coding apparatus of FIG. 3, a line of grey-level image data is obtained from a raster-scan, direct memory, or other well known means, and is sent to a bitplane decomposition circuit 41. The bitplane decomposition circuit 41 provides, in a well known manner, a series of bit values at the outputs labeled 1 to k. The circuit 41 sends the 1 bit line data to a current bitplane current line memory 42 in response to an internal clock (not shown) along with the k bit line data to the bitplane current line memory 47. In the first bit plane clock cycle of 41, the line data of the $1^{th}$ bitplane is sent to the current bitplane current line memory 42. The outputs from the current line memory 42 are directed as inputs to a current bitplane previous line memory 43 and to the input of a context former 45. Upon start up of the system the current bitplane previous line memory 43 and a previous bitplane frame memory 44 are initialized to contain all zeros. Bitplane line data from the current line memory 42 and the initialized memories 43 and 44 are sent to the context former 45 to be formed into a three dimensional (3-D) context. The context output from 45 is a sequence of context bits that form a context address for an arithmetic coder 46. The previous line data (bit to be encoded) from the current bitplane previous line memory 43 is sent to the previous bitplane frame memory 44 and to the arithmetic coder 46 and the context former 45. Additional bitplane frame memories 48 may be added as needed.

Figure 4:
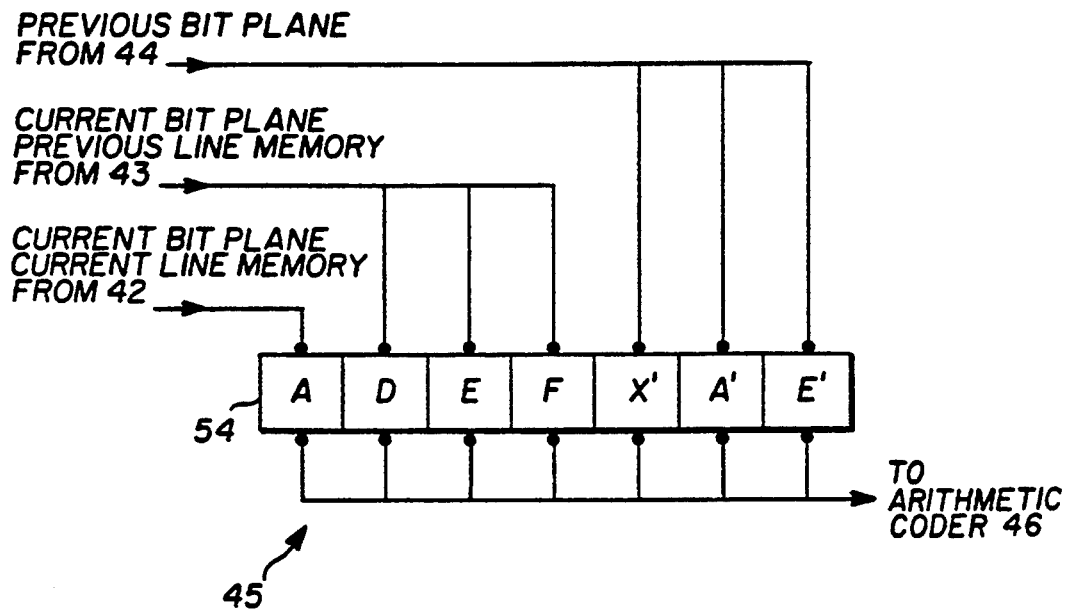
FIG. 4 illustrates in more detail, the context former of FIG. 3.

Referring to FIG. 4, a register 54 is configured to receive the previous bit plane values X', A', and E' from the bitplane frame memory 44 along with the current bitplane previous line memory values D, E and F from the previous line memory 43, and the current bitplane current line value of A. These values form the context bits that are forwarded to the arithmetic coder 46.

Figure 5:
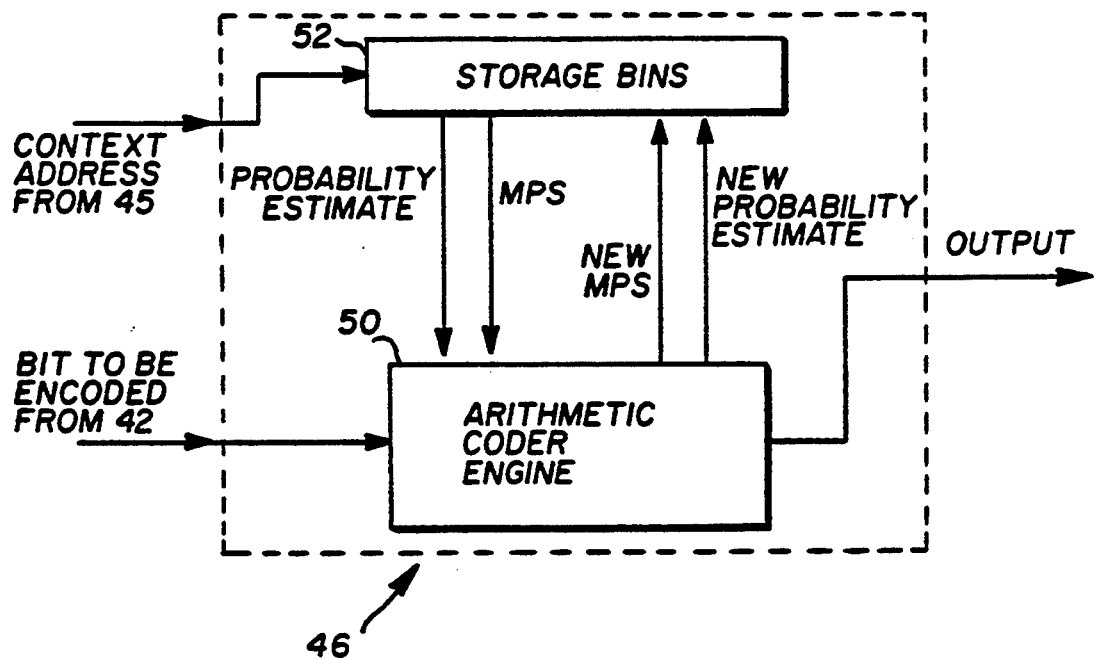
FIG. 5 illustrates as a block diagram an adaptive arithmetic coder that may be used for the like labeled box of FIG. 3

Referring to FIG. 5 indexed by a context address signal that is generated by the context former 45 a group of storage bins 52 contained within the arithmetic coder 46 that has stored therein the most probable symbol (MPS) and probability estimate for each context provides the selected values at it's like labeled outputs. An arithmetic coder engine 50 receives the probability estimate and MPS from the storage bins addressed by the context address formed by the context former 45, and evaluates them given the current bit to be encoded from the current bitplane current line memory 42. The arithmetic coder 46 then updates the storage bins with the new values for the probability estimate and MPS. The output of the coder 46 is the encoded bit sequence which is transmitted or stored. The entire image line encoding procedure is repeated for all image lines of the original grey level input.

The encoding of the remaining lines of each bitplane follow the same procedure through the system. The contents of memory 42 are shifted out to the current bitplane previous line memory 43. The new image line data is sent to the bitplane decomposition circuit 41 where the bitplanes are again sequentially sent to memory 42 one line of data at a time and so forth.

When all of the lines of the first bitplane have been encoded, the clock signal, clocking the bitplane decomposition circuit 41 causes an incrementing of the output to the next bitplane. In the subsequent clock cycles the remaining k−1 bitplane line segments are encoded for each line of the original image line data.

Although the encoding scheme of the present invention has been described in terms of using the next more significant bitplane to form a context, it is to be understood that the next lower significant bitplane could be used instead, provided that the direction of the transmission is reversed. This invention is therefore directed to the use of a bitplanes other than the one containing the bit of present interest in combination with the plane having the bit of present interest to encode and or decode the bit of present interest.

While there has been shown what are considered to be the preferred embodiments of the invention, it will manifest that many changes and modifications may be made therein without departing from the essential spirit of the invention. It is intended, therefore, in the annexed claims, to cover all such changes and modifications as may fall within the true spirit of the invention.

We claim:

1. A method for decomposing a digital image formed as a matrix of pixel values with each pixel value being represented as a k bit binary number, each of said k bits having a bit significance level, said method comprising the steps of:

forming a first bitplane of bits having the same bit significance level;

forming a k−1 or less bitplanes of bits each having a particular bit significance level, but different than the bit significance level of said first bitplane; and encoding, by an arithmetic coder, each of the bits of the k−1 or less formed bit planes by a context formed with bit values from at least two of said bitplanes with said context including bit values from a plurality of neighboring pixels.

2. A method for decomposing a digital image formed as a matrix of pixel values with each value being represented as a k bit binary number, each of said k bit numbers having a bit significance level, said method comprising the steps of:

forming a first bitplane of bits having the same bit significance level;

storing, in a memory, the bits of the formed first bitplane;

forming at least a second bitplane of bits having a bit significance level differing from the bit significance level of the first bitplane;

storing, in the memory, the bits of the second formed bitplane;

encoding, by an arithmetic coder, each of the bits of the at least second formed bitplane by a context formed with bits from at least the first and the second bitplanes with said context including a plurality of neighboring pixel bits; and generating, by the arithmetic coder, the encoded bits of said second bitplane.

3. A method for encoding a digital image formed as a matrix of pixel values with each value being represented as a k-bit binary number, each of said k bit binary numbers having a bit significance level, said method comprising the steps of:

a) forming k bitplanes with each bitplane comprised of the bits having the same bit significance level and arranged as to lines of the digital image;

b) storing, in a memory, the bits representing a current line of the digital image;

c) storing, in the memory, the bits representing a previous line of the digital image;

d) storing, in the memory, selected bits from a next more bit significance level bitplane;

e) encoding, by an arithmetic coder, a current pixel bit value by comparing the values of the bits preceding said current pixel in the current line of stored bits and the selected bits representing a previous line of stored bits and at least one bit from the next higher bit significance level bitplane; and f) repeating, by the memory and the arithmetic coder, steps b) through e) for all of the bits in the bitplanes other than the most bit significance level bitplane to provide an encoded digital image.

4. The method for encoding a digital image according to claim 3 and further comprising the step of decoding the digital image.

5. A method for encoding a digital image formed as a matrix of pixel values with each value being represented as a k-bit binary number, each of said k bits having a bit significance level, said method comprising the steps of:

a) forming k bitplanes with each bitplane comprised of the bits having the same bit significance level and arranged as to lines of the digital image;

b) storing, in a memory, the bits representing a previous line of the digital image;

c) storing, in the memory, the bits forming a next higher bit significance level bitplane;

d) encoding, by an arithmetic coder, the value of a pixel bit of interest by comparing the values of the bits from a previous line of stored bits and at least one bit from the next higher order bit significance level bitplane; and e) repeating, by the memory and the arithmetic coder, steps b) through d) for all of the bits in the bitplanes other than the highest bit significance level bitplane to provide an encoded digital image.

6. The method for encoding a digital image according to claim 5 and further comprising the step of decoding the digital image.

7. Apparatus for encoding a gray level image formed as a matrix of pixel values, each pixel formed of a plurality of bits, each bit having a bit significance level, and represented by a corresponding plurality of bitplanes with each bitplane formed of lines of bits having the same bit significance level, comprising:

bitplane forming means for receiving a gray level image and for forming a plurality of bitplanes;

first memory means for storing a line of bit values as received from said bitplane forming means for providing access to a current line of bit values;

second memory means for storing a line of bit values that has been previously stored in said first memory means for providing access to a previous line of bit values from said one bitplane;

third memory means for storing the bitplane having a next higher bit significance level and for providing access to at least one bit from said next higher significance level bitplane;

context forming means for receiving the bit values from said first, second, and third memory means and for forming a three dimensional context bit sequence;

context address generator means for receiving the context bit sequence and for providing a context address signal;

a context memory having stored therein, at context memory locations, a most probable symbol; and arithmetic coder engine receiving the current bit to be encoded and the most probable symbol for encoding the current bit as a function of the most probable symbol.

8. Apparatus for decomposing a digital image formed as a matrix of pixel values with each value being represented as a k bit number, each of said k bits having a bit significance level, said apparatus comprising:

means for forming a first bitplane of bits having the same bit significance level;

means for forming at least $k-1$ bitplanes of bits each having a particular bit significance level, but different than the bit significance level of said first bitplane; and means for encoding each of the bits of the $k-1$ formed bitplanes by a context formed with bit values from at least two of said bitplanes with said context including bit values from a plurality of neighboring pixels.

9. Apparatus for decomposing a digital image formed as a matrix of pixel values with each value being represented as a k bit binary number, each of said k bits having a bit significance level, said apparatus comprising:

means for forming a first bitplane of bits having the same bit significance level;

means for storing the bits of the formed first bitplane;

means for forming at least a second bitplane of bits having a bit significance level differing from the bit significance level of the first bitplane;

means for storing selected bits of the second formed bitplane; and an arithmetic coder encoding each of the bits of the at least second formed bitplane by a context formed with bits from at least the first and second bitplanes with said context including bit values from a plurality of neighboring pixels and generating the encoded bits of said second bitplane.

10. Apparatus for encoding a digital image formed as a matrix of pixel values with each value being represented as a k-bit binary number, each of said k bits having a bit significance level, said apparatus comprising:

means for forming k bitplanes with each bitplane comprised of the bits having the same bit significance level and arranged as to lines of the digital image;

means for storing the bits representing a current line of the digital image;

means for storing the bits representing a previous line of the digital image;

means for storing the bits forming a next higher significant bitplane; and an arithmetic coder encoding a current pixel bit value by comparing the values of the bits preceding said current pixel in the current line of stored bits and the selected bits representing a previous line of stored bits and at least one bit from the next higher bit significance level bitplane.

11. Apparatus for encoding a digital image according to claim 10 and further comprising:

means for coding the digital image.

12. Apparatus for encoding a digital image formed as a matrix of pixel values with each value being represented as a k-bit binary number, each of said k bits having a bit significance level, said apparatus comprising:

means for forming k bitplanes with each bitplane comprised of the bits having the same bit significance level and arranged as to lines of the digital image;

means for storing the bits representing a previous line of the digital image;

means for storing selected bits forming the next higher bit significance level bitplane; and an arithmetic coder encoding the value of a bit of interest by comparing the values of the bits from a previous line of stored bits and at least one bit from the next higher bit significance level bitplane.

13. A method for decomposing a digital image formed as a matrix of pixel values with each value being represented as a k bit Gray code number, each of said k bits having a bit significance level, said method comprising the steps of:

forming a first bitplane of bits having the same bit significance level;

forming $k-1$ or less bitplanes of bits each having a particular bit significance level, but different than the bit significance level of said first bitplane; and encoding, by an arithmetic coder, each of the bits of the $k-1$ or less formed bitplanes by a context formed with bit values from at least two of said bitplanes with said context including bit values from a plurality of neighboring pixels.

* * * * *